US009587565B2

(12) United States Patent
Streutker et al.

(10) Patent No.: US 9,587,565 B2
(45) Date of Patent: Mar. 7, 2017

(54) VALVE STOP FOR ENGINE WITH EXHAUST GAS RECIRCULATION

(75) Inventors: Daniel Streutker, Lafayette, IN (US); Aaron C. Luft, Frankfort, IN (US)

(73) Assignee: Caterpillar Inc., Peoria, IL (US)

( * ) Notice: Subject to any disclaimer, the term of this patent is extended or adjusted under 35 U.S.C. 154(b) by 708 days.

(21) Appl. No.: 13/163,366

(22) Filed: Jun. 17, 2011

(65) Prior Publication Data

US 2012/0317978 A1 Dec. 20, 2012

(51) Int. Cl.

| | |
|---|---|
| ***F02D 9/04*** | (2006.01) |
| ***F02D 9/10*** | (2006.01) |
| ***F02M 26/08*** | (2016.01) |
| ***F02M 26/10*** | (2016.01) |
| ***F02M 26/24*** | (2016.01) |
| ***F16K 1/52*** | (2006.01) |
| *F02M 26/43* | (2016.01) |
| *F02M 26/47* | (2016.01) |
| *F02B 29/04* | (2006.01) |
| *F02B 37/00* | (2006.01) |
| *F02B 37/007* | (2006.01) |

(52) U.S. Cl.

CPC ............... *F02D 9/04* (2013.01); *F02M 26/08* (2016.02); *F02M 26/10* (2016.02); *F02M 26/43* (2016.02); *F02B 29/0406* (2013.01); *F02B 37/001* (2013.01); *F02B 37/007* (2013.01); *F02D 9/1045* (2013.01); *F02M 26/24* (2016.02); *F02M 26/47* (2016.02)

(58) Field of Classification Search

CPC F02D 9/04; F02D 9/1045; F02D 9/06; F02M 25/0713; F02M 25/0749; F02M 25/0711; F02M 25/0732; F02M 25/0754; F02B 29/0406; F02B 37/001; F02B 37/007; Y02T 10/121

USPC ......... 60/605.2; 123/568.2, 568.12; 251/286, 251/287, 305

See application file for complete search history.

(56) References Cited

U.S. PATENT DOCUMENTS

| | | | | |
|---|---|---|---|---|
| 2,174,547 A * | 10/1939 | Bailey | F16K 1/22 | 251/118 |
| 2,730,090 A | 1/1956 | Holl | | |
| 2,892,609 A * | 6/1959 | Bibbo | F16K 1/24 | 251/163 |
| 3,940,928 A * | 3/1976 | Pozniak | F01N 3/22 | 137/115.13 |

(Continued)

FOREIGN PATENT DOCUMENTS

| | | |
|---|---|---|
| DE | 102007025178 | 8/2008 |
| DE | 102008042513 | 4/2010 |

(Continued)

*Primary Examiner* — Thomas Denion
*Assistant Examiner* — Jessica Kebea
(74) *Attorney, Agent, or Firm* — Leydig, Voit & Mayer, Ltd.

(57) ABSTRACT

A butterfly valve includes a body with a bore through which exhaust gas may flow and a valve member rotatably mounted within the bore for restricting flow through the bore. A stop extends into the bore to limit movement of the valve member and prevent the valve member from rotating to a closed position. The stop defines a restricted flow position at which the valve member is positioned between an open position and the closed position. An internal combustion engine utilizing the butterfly valve is also provided.

16 Claims, 7 Drawing Sheets

(56) References Cited

U.S. PATENT DOCUMENTS 4,171,686 A 10/1979 Chenet
4,205,704 A 6/1980 Benson
4,211,734 A * 7/1980 Cheng ...................... F02M 1/02 248/231.61
4,254,752 A * 3/1981 Friddell .................... F02D 9/04 123/323
4,294,780 A * 10/1981 DuBois .................... F02M 1/10 251/286
4,707,987 A 11/1987 Atkin
4,989,566 A 2/1991 Wallerand
5,732,688 A 3/1998 Charlton et al.
6,230,682 B1 * 5/2001 Gustafsson ............. F02D 21/08 123/323
6,295,815 B1 * 10/2001 Bechle et al. ............... 60/605.2
6,484,703 B1 * 11/2002 Bailey ...................... 123/568.15
6,516,774 B2 * 2/2003 zur Loye .................. F02B 1/12 123/299
6,698,717 B1 3/2004 Brookshire et al.
6,810,850 B2 * 11/2004 Anderson ................. F02D 9/06 123/142.5 R
6,874,488 B2 4/2005 Ieda
6,941,900 B1 * 9/2005 Malinov ................. F01C 9/005 123/18 R
7,069,919 B1 * 7/2006 Atkinson ................ F02D 9/101 123/568.18
7,168,682 B2 1/2007 Nanba et al.
7,240,691 B2 * 7/2007 Bevan ........................... 137/554
7,607,302 B2 * 10/2009 Fry et al. ........................ 60/612
7,607,638 B2 10/2009 Wilson et al.
7,753,039 B2 * 7/2010 Harima ................. F01N 3/0842 123/443
7,849,684 B2 * 12/2010 Gerards .................... F02D 9/04 60/299
8,122,873 B2 * 2/2012 Furukawa et al. ....... 123/568.24
8,201,401 B2 * 6/2012 Abram et al. .................. 60/324
8,453,446 B2 * 6/2013 Onishi ................ F02D 41/0007 123/198 DB
2003/0140624 A1 7/2003 Tatsukawa
2008/0230040 A1 9/2008 Wilson et al.
2009/0133669 A1 * 5/2009 Ishihara .................. F02D 9/101 123/337
2009/0205610 A1 * 8/2009 Jumonji .................... F02D 9/02 123/337
2010/0132357 A1 * 6/2010 Elsasser .................. F02B 37/02 60/605.2
2010/0206274 A1 * 8/2010 Furukawa et al. ....... 123/568.11
2010/0237269 A1 * 9/2010 Furukawa ............... F02D 9/101 251/318
2011/0023846 A1 2/2011 Miyazaki et al.
2011/0100001 A1 * 5/2011 Lilly ............................ 60/605.2
2011/0252794 A1 * 10/2011 Lupescu et al. ............. 60/605.2
2012/0260650 A1 * 10/2012 Luft et al. ....................... 60/599
2012/0260653 A1 * 10/2012 Luft et al. .................... 60/605.2

FOREIGN PATENT DOCUMENTS

EP 1847738 A1 10/2007
GB 1043865 A * 9/1966
GB 2072753 10/1981

* cited by examiner

FIG. 7
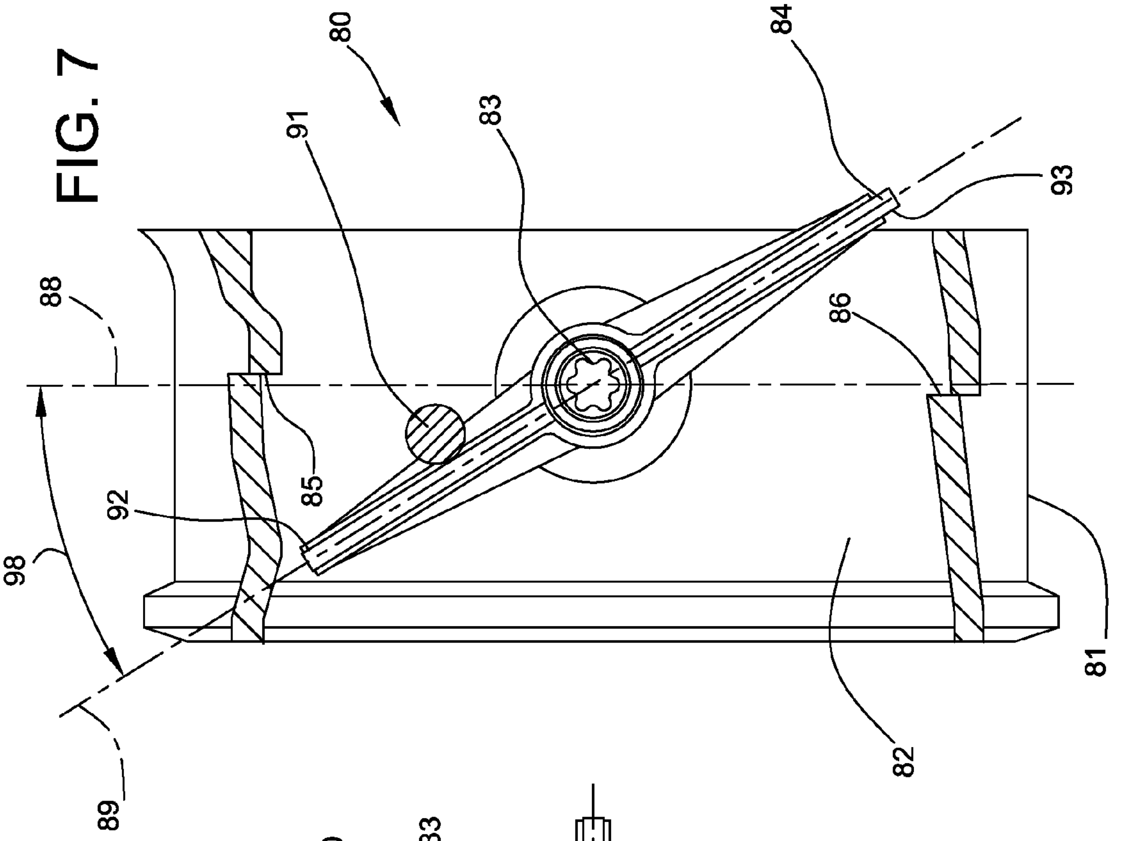
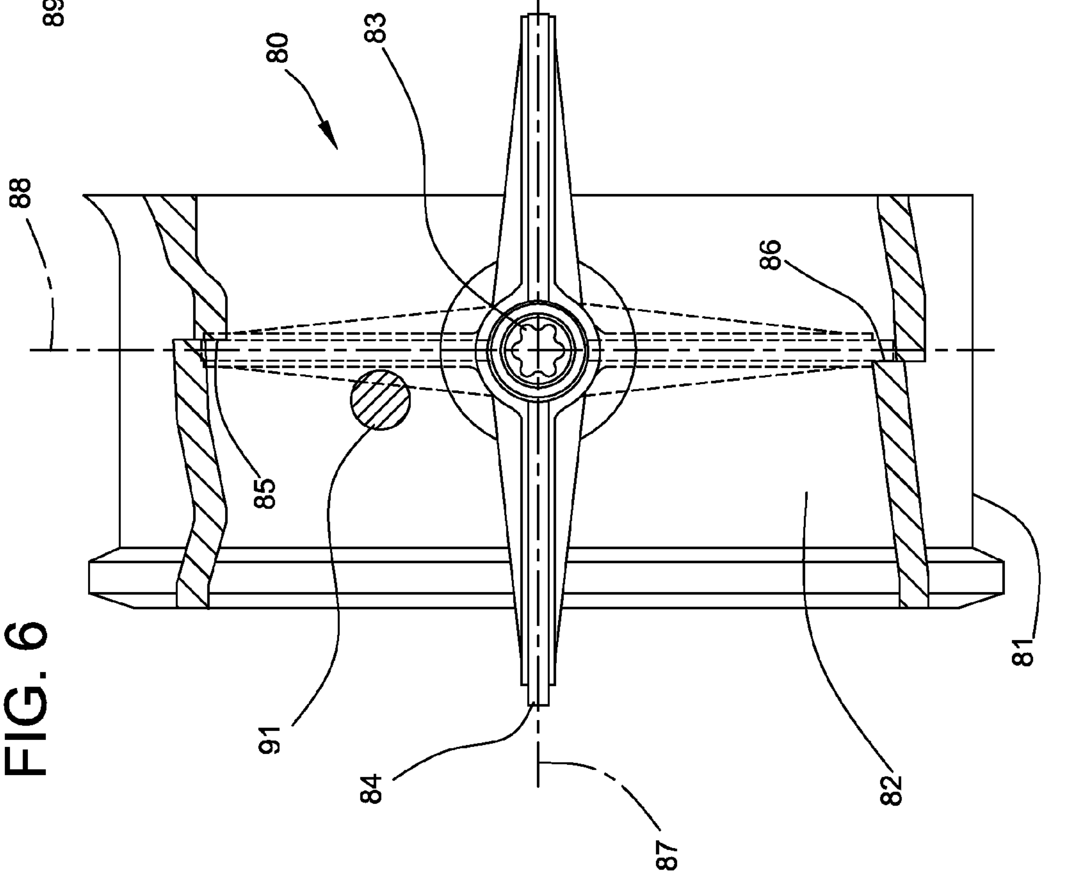
FIG. 6

VALVE STOP FOR ENGINE WITH EXHAUST GAS RECIRCULATION

TECHNICAL FIELD

This disclosure relates generally to an internal combustion engine with an exhaust gas recirculation system and, more particularly, to a stop for limiting movement of an exhaust restriction valve.

BACKGROUND

An exhaust gas recirculation system may be used to reduce the generation of undesirable pollutant gases during the operation of internal combustion engines. Exhaust gas recirculation systems generally recirculate exhaust gas generated during the combustion process into the intake air supply of the internal combustion engine. The exhaust gas introduced into the engine cylinders displaces a volume of the intake air supply that would otherwise be available for oxygen. Reduced oxygen concentrations lower the maximum combustion temperatures within the cylinders and slow the chemical reactions of the combustion process, which decreases the formation of oxides of nitrogen ($NO_x$).

Some internal combustion engines having an exhaust gas recirculation system include an exhaust restriction valve for controlling the amount of exhaust gas that is diverted to the exhaust gas recirculation system and an exhaust gas recirculation control valve for controlling the amount of exhaust gas that passes through the exhaust gas recirculation system. A control system may be used to control the operation of the exhaust restriction valve as well as the exhaust gas recirculation control valve. Proper control of the exhaust restriction valve and the exhaust gas recirculation control valve is desirable to optimize engine performance and minimize pollutants.

U.S. Pat. No. 6,698,717 discloses a butterfly valve for use with an internal combustion engine having an exhaust gas recirculation system. The bore of the butterfly valve is configured to improve gas flow control sensitivity and to reduce or eliminate the unwanted passage of exhaust gas through the valve.

The foregoing background discussion is intended solely to aid the reader. It is not intended to limit the innovations described herein nor to limit or expand the prior art discussed. Thus the foregoing discussion should not be taken to indicate that any particular element of a prior system is unsuitable for use with the innovations described herein, nor is it intended to indicate any element, including solving the motivating problem, to be essential in implementing the innovations described herein. The implementations and application of the innovations described herein are defined by the appended claims.

SUMMARY

An internal combustion engine having an exhaust gas recirculation system is provided. In one aspect, an internal combustion engine has a plurality of combustion cylinders and an exhaust gas system fluidly connected to the plurality of combustion cylinders. An intake air system supplies air to the combustion cylinders. The exhaust gas system includes an exhaust manifold, an exhaust gas outlet, and an exhaust restriction valve for controlling the flow of exhaust gas from the exhaust manifold to the exhaust gas outlet. The exhaust restriction valve includes a body with a bore through which exhaust gas may flow and a valve member within the bore for restricting flow through the bore. The valve member is movable between a first open position at which flow through the bore is substantially unrestricted by the valve member and a second closed position at which flow through the bore is substantially blocked or prevented. A stop prevents the valve member from moving to the second closed position and defines a third restricted flow position between the first open position and the second closed position. An exhaust gas recirculation system recirculates exhaust gas from the exhaust gas system to the intake air system. The exhaust gas recirculation system includes an exhaust gas recirculation control valve for controlling the flow of exhaust gas from the exhaust manifold to the intake air system.

In another aspect, a butterfly valve includes a body with a bore through which exhaust gas may flow and a valve member within the bore for restricting flow through the bore. The valve member is rotatable between a first open position at which flow through the bore is substantially unrestricted by the valve member and a second closed position at which flow through the bore is substantially blocked. A stop extends into the bore to limit movement of the valve member and prevent the valve member from rotating to the second closed position. The stop defines a third restricted flow position at which the valve member is positioned between the first open position and the second closed position.

BRIEF DESCRIPTION OF THE DRAWINGS

FIG. 6 is a fragmented top plan view of the exhaust restriction valve of FIG. 4 with certain parts removed;

FIG. 7 is a fragmented top plan view similar to FIG. 6 but with the plate in the third restricted flow position;

DETAILED DESCRIPTION

Figure 1:
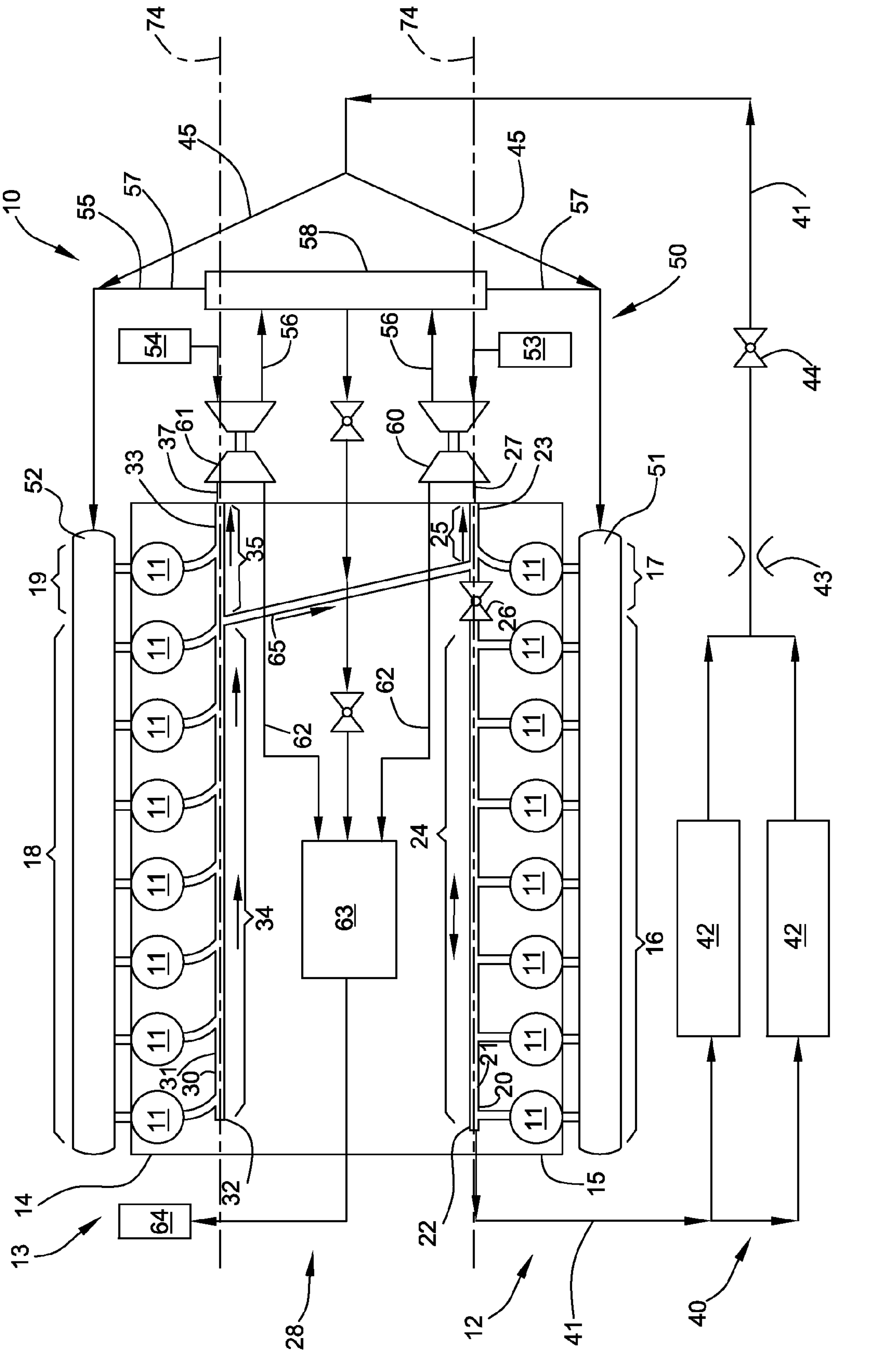
FIG. 1 is a schematic illustration of an internal combustion engine in accordance with the disclosure.

FIG. 1 depicts an internal combustion engine 10 having a plurality of combustion cylinders 11 configured as a first cylinder bank 12 and a second cylinder bank 13 generally parallel to the first cylinder bank. An exhaust gas system 28 includes a first exhaust gas line 20 and a second exhaust gas line 30. The first exhaust gas line 20 is fluidly connected to the first cylinder bank 12 and the second exhaust gas line 30 is fluidly connected to the second cylinder bank 13. Compressed air is supplied to the first and second cylinder banks 12, 13 by intake air system 50. An exhaust gas recirculation system 40 provides for the recirculation of exhaust gas into the intake air system 50 in order to reduce the emissions of the internal combustion engine 10.

A first cylinder head 14 is secured to the internal combustion engine 10 adjacent the first cylinder bank 12 and a second cylinder head 15 is secured to the internal combustion engine adjacent the second cylinder bank 13 of combustion cylinders. The first cylinder bank 12 includes a first cylinder group 16 and a second cylinder group 17. The second cylinder bank 13 includes a first cylinder group 18 and a second cylinder group 19. While the first cylinder group 16 of first cylinder bank 12 and the first cylinder group 18 of the second cylinder bank 13 are each depicted with seven combustion cylinders 11 and the second cylinder group 17 of the first cylinder bank 12 and the second cylinder group 19 of the second cylinder bank 13 are each depicted with one combustion cylinder 11, the combustion cylinders of each cylinder bank may be grouped as desired to define or form cylinder groups having different numbers of combustion cylinders.

First exhaust gas line 20 includes a first exhaust manifold 21 that is fluidly connected to the first cylinder bank 12. First exhaust manifold 21 has a first end 22 and an opposite exhaust end 23 with a first section 24 and a second section 25 between the two ends. An exhaust restriction valve 26 may be positioned between the first section 24 and the second section 25. A first extension pipe 27 extends between the exhaust end 23 of first exhaust manifold 21 and first turbocharger 60 and fluidly connects the first exhaust manifold to the first turbocharger.

Second exhaust gas line 30 includes a second exhaust manifold 31 that is fluidly connected to the second cylinder bank 13. The second exhaust manifold 31 may be generally parallel to the first exhaust manifold and has a first end 32 and an opposite exhaust end 33 with a first section 34 and a second section 35 between the two ends. A second extension pipe 37 extends between the exhaust end 33 of the second exhaust manifold 31 and second turbocharger 61 and fluidly connects the second exhaust manifold to the second turbocharger.

Exhaust gas from the first cylinder group 16 of the first cylinder bank 12 is received within the first section 24 of the first exhaust manifold 21 and, depending upon the positions of exhaust restriction valve 26 and exhaust gas recirculation valve 44, may be routed through the exhaust gas recirculation system 40. The exhaust gas recirculation system 40 includes an exhaust gas recirculation duct 41 that may be fluidly connected to the first end 22 of the first exhaust gas line 20 so that exhaust gas from the first cylinder group 16 of the first cylinder bank 12 may be routed or recirculated through the exhaust gas recirculation system and introduced into the intake air system 50.

Exhaust gas passing through exhaust gas recirculation duct 41 is cooled by one or more cooling components 42. The flow rate through exhaust gas recirculation duct 41 may be monitored by a flow meter 43 such as a venturi-style flow meter. An exhaust gas recirculation control valve 44 may be provided along exhaust gas recirculation duct 41 to control exhaust gas flow through the exhaust gas recirculation system 40. Exhaust gas recirculation control valve 44, together with exhaust restriction valve 26, controls the amount of exhaust gas that is mixed with air that has been compressed by the first turbocharger 60 and the second turbocharger 61 prior to the air entering the first intake manifold 51 and the second intake manifold 52. The exhaust gas recirculation duct 41 of the exhaust gas recirculation system 40 may be split into two separate legs 45. Each leg 45 fluidly connects to the intake air system 50 between the aftercooler 58 and the first intake manifold 51 and the second intake manifold 52, respectively.

Intake air system 50 includes a first air intake 53 through which atmospheric air enters the first turbocharger 60, a second air intake 54 through which atmospheric air enters the second turbocharger 61 and a compressed air line 55 through which compressed air is fed to combustion cylinders 11. Atmospheric air is compressed by the first and second turbochargers 60, 61 and passes through first compressed air lines 56 to aftercooler 58. Cooled compressed air exits the aftercooler 58 and enters second compressed air lines 57 that are each fluidly connected to a respective one of the first and second intake manifolds 51, 52. Each leg 45 of the exhaust gas recirculation system 40 intersects with and fluidly connects to a respective one of the second compressed air lines 57 between the aftercooler 58 and the first and second intake manifolds 51, 52. In this way, exhaust gas may be mixed with intake air provided to the combustion cylinders 11.

A portion of exhaust gas from the first cylinder group 16 of the first cylinder bank 12 is, at times, routed through the exhaust gas recirculation system 40 rather than through the first exhaust gas line 20. For this reason, a duct or exhaust gas balance tube 65 is fluidly connected between the first exhaust gas line 20 and the second exhaust gas line 30 to balance or equalize, to a controllable extent, the amount of exhaust gas passing through the first and second turbochargers 60, 61. In other words, the exhaust gas balance tube 65 provides a path for exhaust gas to travel from second exhaust gas line 30 towards first exhaust gas line 20 to balance the flow through the first and second turbochargers 60, 61.

After the exhaust gas from the first cylinder bank 12 and second cylinder bank 13 passes through the first and second turbochargers 60, 61, respectively, it exits the turbochargers through turbocharger exhaust gas lines 62. Turbocharger exhaust gas lines 62 are fluidly connected to an external aftertreatment system 63 such as a diesel particulate filter so that the exhaust gas is filtered prior to being discharged or released to the atmosphere through exhaust gas outlet 64.

Figure 2:
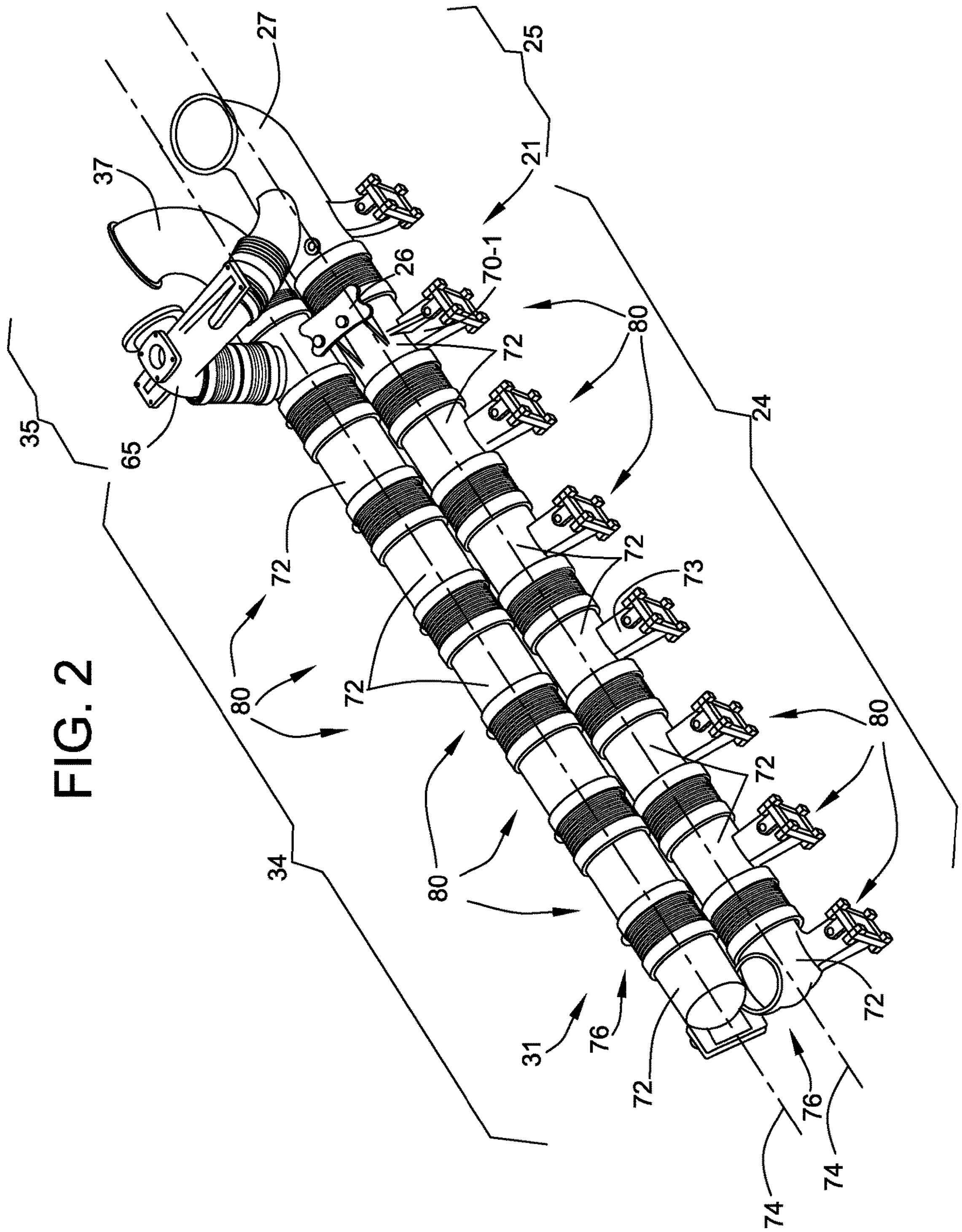
FIG. 2 is a perspective view of the exhaust manifolds in accordance with the disclosure.
Figure 3:
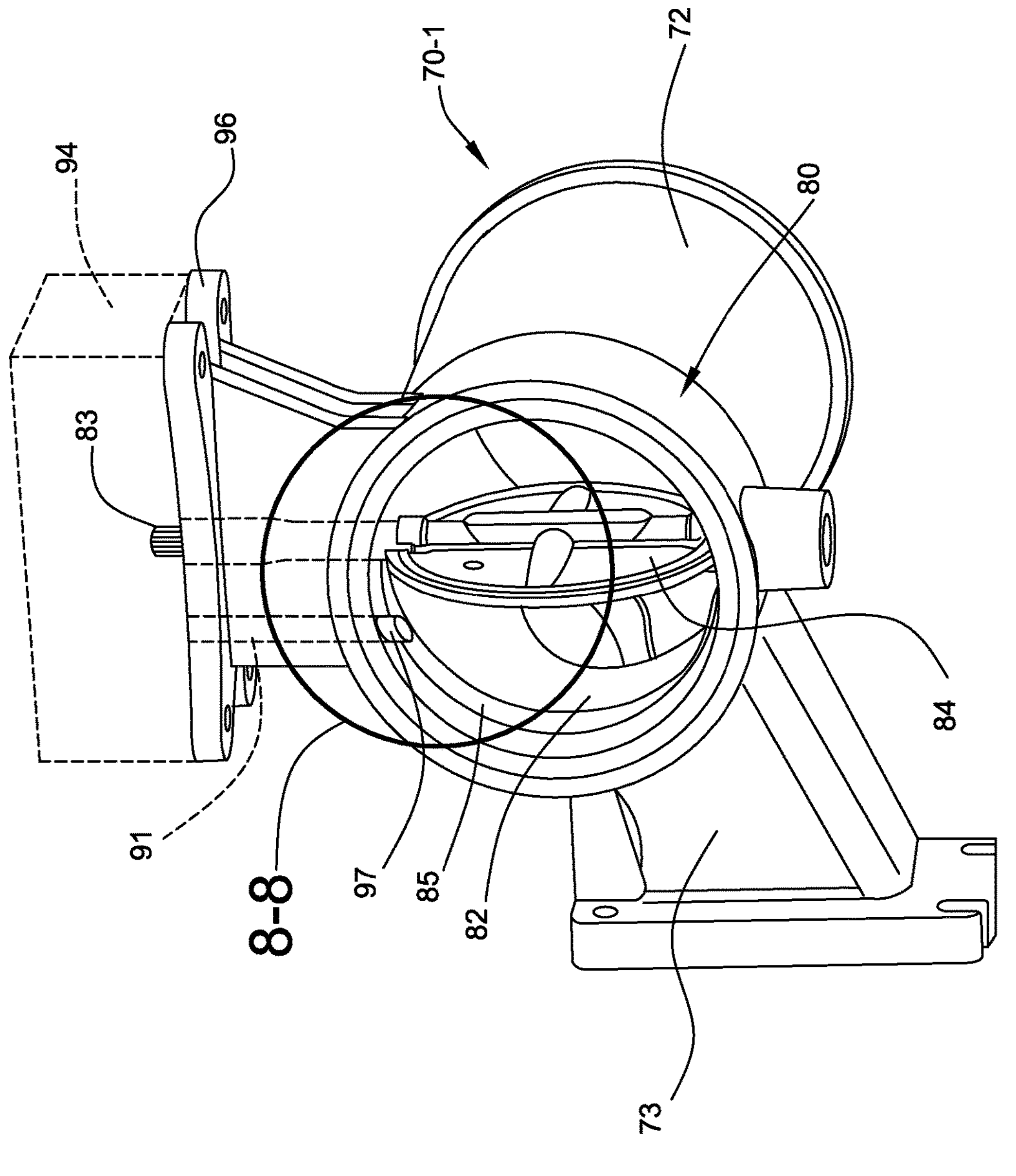
FIG. 3 is an enlarged perspective view of an exhaust manifold element having the exhaust restriction valve therein as viewed from the right hand side of FIG. 2.

Referring to FIG. 2, the first exhaust manifold 21 and the second exhaust manifold 31 are each formed of a plurality of interconnected exhaust manifold elements 70. Each of the exhaust manifold elements 70 may be mechanically and fluidly connected to an adjacent manifold element by connecting members 71. The connecting members 71 may be formed with a bellows, a slip-fit joint or another structure that is capable of expanding and contracting to compensate for thermal expansion of the exhaust manifold elements 70. Each exhaust manifold element 70 includes a generally cylindrical hollow duct component 72 and a hollow pipe component 73 for fluidly connecting a combustion cylinder 11 to the duct component 72. The duct components 72 of the exhaust manifold elements 70 are spaced apart in an array connected by the connecting members 71 along longitudinal axis 74 of first exhaust manifold 21 to form a generally linear tube-like duct portion 76 of the first exhaust manifold for directing exhaust gas from each combustion cylinder towards the exhaust end 23 of the first exhaust manifold. In other words, each of the connecting members 71 and duct components 72 is positioned along and forms a section of the generally linear tube-like duct portion 76. The second exhaust manifold 31 may be constructed in a manner similar to first exhaust manifold 21.

Exhaust restriction valve 26 may be configured as a butterfly valve 80 and positioned within exhaust manifold element 70-1. Referring to FIGS. 2-8, exhaust restriction valve 26 includes a valve housing or body 81 with a cylindrical bore 82 through which exhaust gas flows. The cylindrical bore may be positioned along longitudinal axis 74 of the first exhaust manifold 21 and aligned with duct components 72 of the exhaust manifold elements 70 so as to form a portion of tube-like duct portion 76 of the first exhaust manifold. A stem or shaft 83 is rotatably mounted on the body and extends diametrically through the center of the bore 82. A valve member in the form of a generally circular flapper or plate 84 is mounted on the shaft 83 and is dimensioned to fit within the bore 82. A first valve seat 85 and a second valve seat 86 may be aligned along the bore 82 on opposite sides of shaft 83. Each valve seat may be generally flat and extends along an arc of approximately one hundred and eighty degrees on opposite sides of the bore 82 and facing in opposite directions relative to the flow of exhaust gas through the bore. If desired, the valve seats may be omitted.

The assembly of the shaft 83 and plate 84 is configured so as to be moveable or rotatable within the bore 82 between a first open position 87 (FIG. 6) and a second closed position depicted in phantom at 88 in FIG. 6. At the first open position 87, the plate 84 is generally parallel to the direction of flow of exhaust gas through the bore 82 so that flow through the bore is substantially unrestricted. At the second closed position 91, the plate 84 is positioned generally perpendicular to the direction of flow of exhaust gas through the bore and aligned with the first valve seat 85 and the second valve seat 86. A first side 92 of the plate 84 engages the first valve seat 85 and a second side 93 of the plate, opposite the first side, engages the second valve seat 86. By positioning the plate 84 across the bore 82 and the engagement of the first side 92 of the plate 84 with the first valve seat 85 and the second side 93 of the plate 84 with the second valve seat 86, flow of exhaust gas through the bore 82 is substantially blocked or prevented. An actuator 94 may be connected to the end of the shaft 83 in order to control rotation of the shaft and thus the position of the plate 84 across the bore 82. The actuator may be any type of actuator including electrical, gear or lever driven, hydraulic, or pneumatic.

Figure 5:
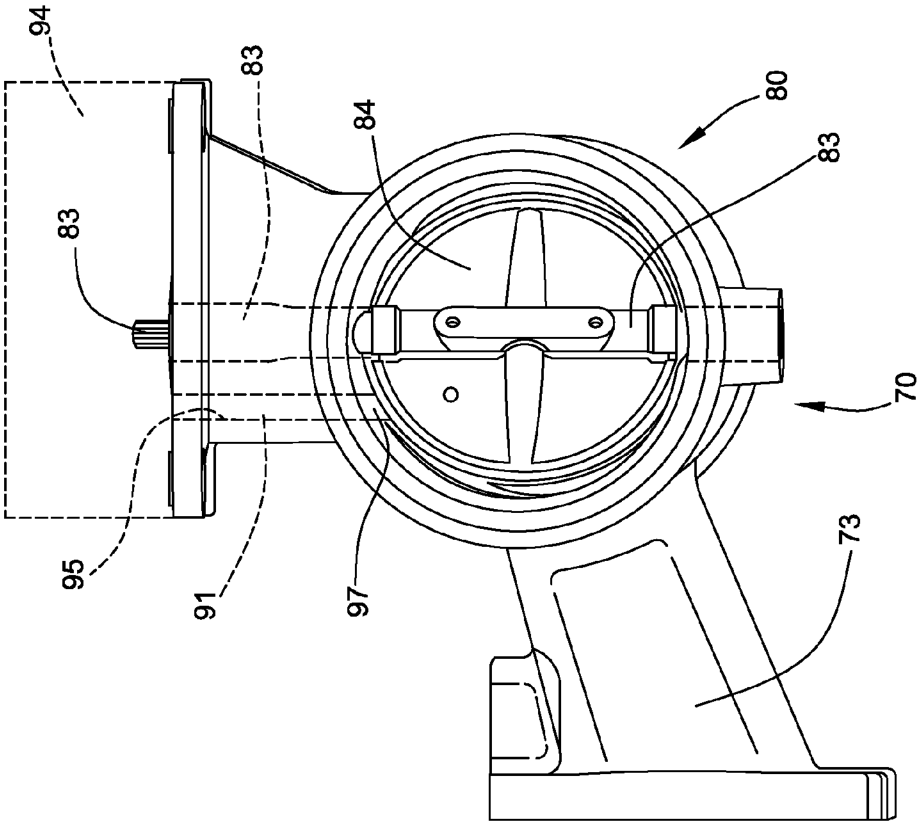
FIG. 5 is an end view similar to FIG. 4 but with the plate in the third restricted flow position.
Figure 4:
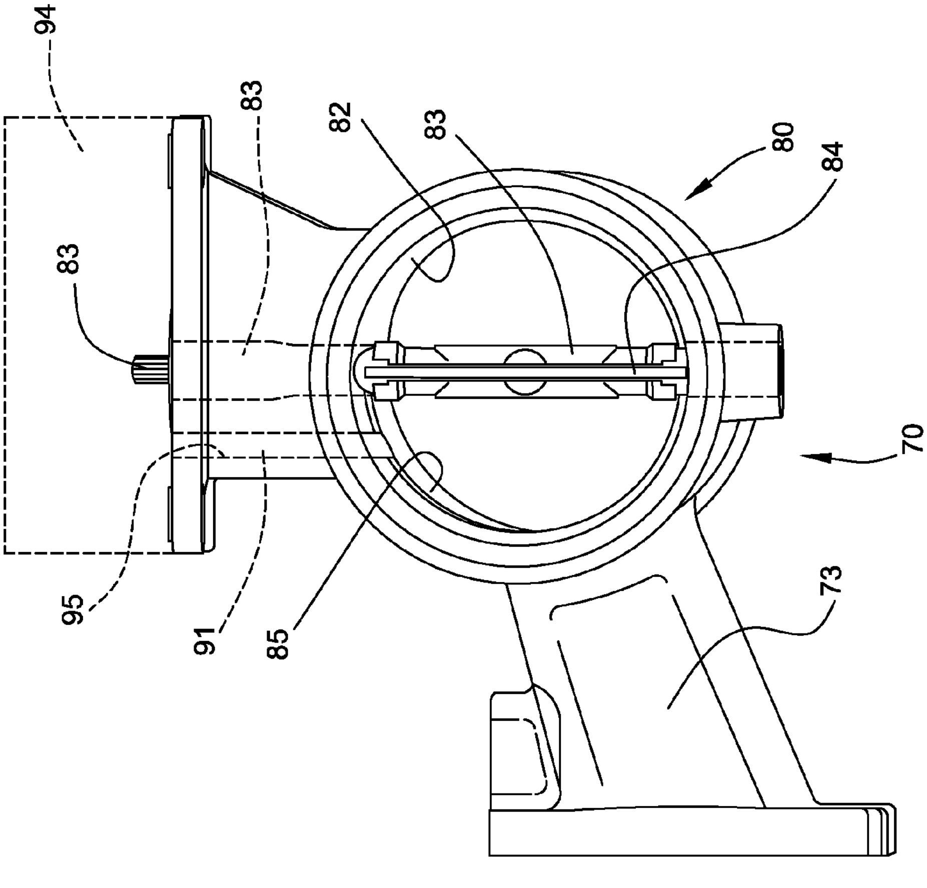
FIG. 4 is an end view of the exhaust manifold element and exhaust restriction valve of FIG. 3 with the plate in the first open position.
Figure 8:
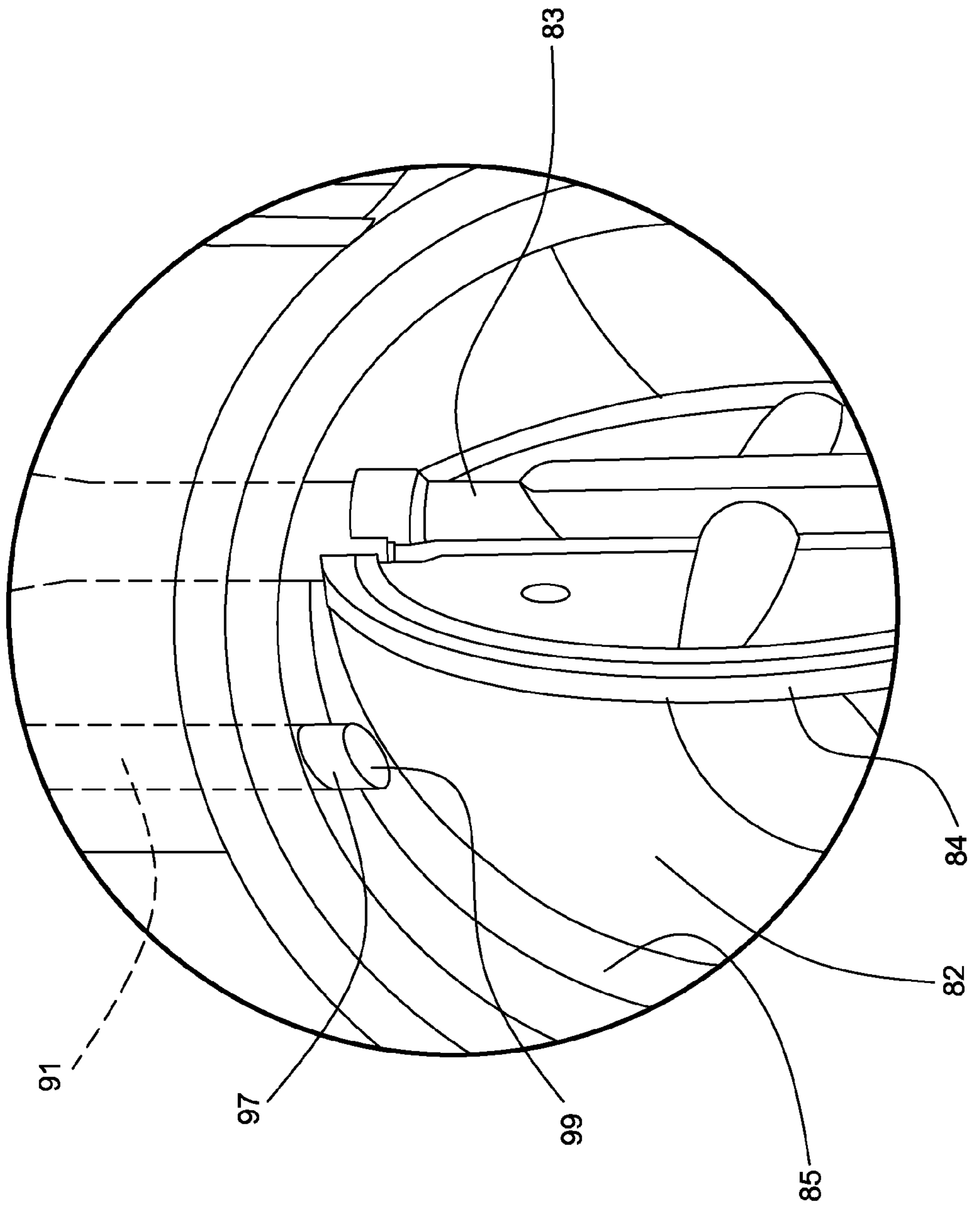
FIG. 8 is an enlarged view of the encircled portion 8-8 of FIG. 3.

Closure of the exhaust restriction valve 26 beyond a desired amount will typically negatively impact performance of the internal combustion engine 10. Further, complete closure of the exhaust restriction valve 26 may, under some circumstances, cause damage to the engine. In order to prevent the assembly of the shaft 83 and plate 84 from moving undesirably to the second closed position 88, a mechanical limit or stop 90, in the form of a pin 91, extends into and may be fixed within the bore 82 to physically block or prevent the valve member or plate 84 from rotating past a desired position. A pin receiving bore or hole 95 extends downward from the flange 96 upon which the actuator 94 is mounted, as best seen in FIGS. 4, 5, and 8, and extends into the upper quarter of the circumference of the bore 82. The pin 91 may be secured within the hole 95 with an interference fit and fasteners such as one or more set screws (not shown) so that a portion 97 of the pin projects into bore 82 and will engage the plate 84 before the first side 92 of the plate 84 engages the first valve seat 85 and the second side 93 of the plate engages the second valve seat 86. As a result of the pin 91, the plate 84 is prevented from reaching the second closed position 88 and is stopped at a third restricted flow position 89 (FIG. 7).

As depicted in FIG. 7, at the third, restricted flow position 89, the plate 84 is at an angle 98 of approximately thirty degrees from being transverse to the longitudinal axis 74 of the bore 82 and thus exhaust gas may pass through the exhaust restriction valve 26. The angle 98 of the third restricted flow position 89 may be set according to the desired operating characteristics of the internal combustion engine 10. As an example, if the maximum intended angle of closure of the plate 84 is forty degrees during normal operation of the engine, it may be desirable to set the third restricted flow position 89 at an angle 98 of thirty degrees. In another example, the maximum intended angle of closure may only be thirty degrees but the third restricted flow position 89 could be set with an angle 98 of twenty degrees. In each of these examples, a desired maximum angle of closure is determined and a margin of safety or tolerance of ten degrees has been added beyond the desired maximum angle. In some circumstances, the margin of safety or tolerance may be more or less than ten degrees. Accordingly, it is believed that under most operating conditions, angle 98 may be set between forty and ten degrees (i.e., 25 degrees±10 degrees). In addition, it is believed that when choosing a third restricted flow position 89, the minimum angle at which angle 98 would likely be set would be approximately ten degrees in order to maintain a minimum flow through the exhaust restriction valve 26. In other words, the plate 84 would be at least approximately ten degrees from the second closed position 88. However, if the diameter of the plate 84 is reduced or the valve seats are removed, it may be possible to reduce the angle 98 below approximately ten degrees.

In some circumstances, it may be desirable to configure the pin 91 to minimize the disruption of the flow of exhaust gas through the bore 82. This can be accomplished by minimizing the diameter of the pin 91, minimizing the distance that the end 99 of the pin extends into the bore 82 and/or by angling or slanting the end 99 of the pin. It should be noted that significant disruption of the exhaust gas flow past exhaust restriction valve 26 due to pin 91 may result in asymmetrical flow through bore 82. Such asymmetrical flow may result in significant forces and stresses on the shaft 83, plate 84 and actuator 94 if the asymmetry and flow are great enough. As a result, under some operating conditions and with certain configurations, it may be desirable to minimize any asymmetrical disruptions of exhaust gas flow past exhaust restriction valve 26. It should be noted that the slanted end 99 of pin 91 may also increase the surface area of the pin that engages plate 84 in order to reduce wear.

In one embodiment, the body may be formed of cast iron and the bore has a diameter of approximately 120 mm. The pin may be formed of stainless steel, has a diameter of approximately 10 mm and extends into the bore approximately 6 mm. The end 99 of the pin 91 may be dimensioned and slanted so as to be generally aligned with the profile of the first valve seat 85 in order to minimize the disruption of the flow of exhaust gas. In some circumstances, it may be desirable for the pin 91 to extend into the bore 82 a distance no greater than approximately ten percent of the diameter of the bore.

Providing a mechanical stop to prevent complete closure of the plate 84 may be desirable in case of a control malfunction or error that would otherwise permit movement of the plate to or towards the fully closed position or a mechanical failure that results in unrestricted movement of the plate. Examples of failures that may result in unrestricted movement may include a failure of any of the components of the exhaust restriction valve 26, a failure of the interconnection between the shaft 83 and the plate 84, a failure of the actuator 94, or a failure of the interconnection between actuator and the plate.

In an alternate embodiment, first valve seat 85 and second valve seat 86 could be eliminated so that the bore 82 has a smooth, constant diameter. While valve seats are often used with butterfly valves, the first valve seat 85 and second valve seat 86 are unnecessary since pin 91 prevents the plate 84 from reaching either of the valve seats.

Figure 9:
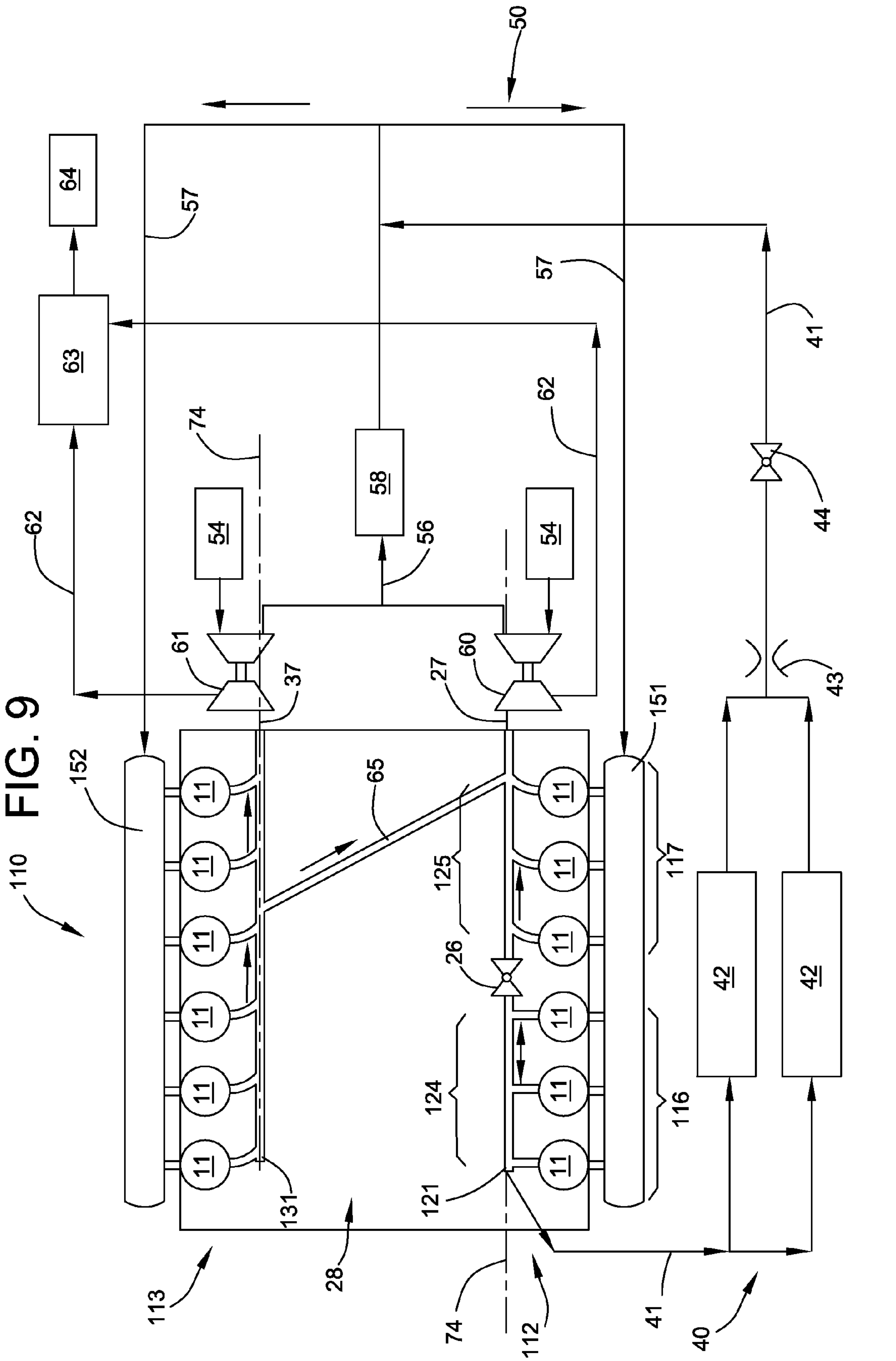
FIG. 9 is a schematic illustration of an alternate embodiment of an internal combustion engine in accordance with the disclosure.

Exhaust restriction valve is depicted as being integral with exhaust element 70-1 and positioned along the first exhaust manifold 21 between the seventh and eighth combustion cylinders 11 of the first cylinder bank 12. However, in the alternative, the exhaust restriction valve 26 may be a separate component positioned between two exhaust manifold elements 80. In addition, the exhaust restriction valve 26 may be positioned at other locations along the first exhaust manifold 21 as well as other positions along the first exhaust gas line 20, such as between the first exhaust manifold and the first turbocharger 60. For example, referring to FIG. 9, an alternate embodiment of an internal combustion engine 100 is depicted. Identical or similar components to those of the embodiment depicted in FIG. 1 are identified with identical reference numbers. In this embodiment, each of the first cylinder bank 112 and second cylinder bank 113 includes six combustion cylinders 11. Accordingly, the first intake manifold 151 and second intake manifold 152 are configured to supply air to the reduced number of combustion cylinders. Similarly, each of the first exhaust manifold 121 and the second exhaust manifold 131 includes six exhaust manifold elements 80 connected to the combustion cylinders. Exhaust restriction valve 26 is positioned generally towards the center of first exhaust manifold 121 such that first cylinder group 116 of the first cylinder bank 112 includes three combustion cylinders and second cylinder group 117 of the first cylinder bank 112 also includes three combustion cylinders. It should be noted that although the internal combustion engines 10, 110 depicted in FIGS. 1, 9 each include two cylinder banks, the features disclosed herein may also be used with internal combustion engines having only a single, in-line bank of combustion cylinders.

INDUSTRIAL APPLICABILITY

The industrial applicability of the system described herein will be readily appreciated from the foregoing discussion. The present disclosure is applicable to valves in which it is desirable to prevent full closure of the valve. One example is an internal combustion engine 10 that utilizes an exhaust gas recirculation system 40 and an exhaust restriction valve 26. The internal combustion engine 10 includes a plurality of combustion cylinders 11 and an intake air system 50 for supplying air to the combustion cylinders. An exhaust gas system 28 is fluidly connected to the combustion cylinders 11. The exhaust gas system 28 includes an exhaust manifold 21, an exhaust gas outlet 64 and an exhaust restriction valve 26 for controlling flow of exhaust gas from the exhaust manifold to the exhaust gas outlet. The exhaust restriction valve 26 includes a body 81 having a bore 82 through which exhaust gas may flow and a valve member 84 for restricting flow within the bore. The valve member 84 is moveable between a first open position 87 at which flow through the bore 82 is unrestricted by the valve member and a second closed 88 position at which flow through the bore is substantially blocked or prevented. A stop 90 is provided to prevent the valve member 84 from moving to the second closed position 88. The stop 90 defines a third restricted flow position 89 between the first open position 87 and the second closed position 88. An exhaust gas recirculation system 40 is also provided for recirculating exhaust gas from the exhaust gas system 28 to the intake air system 50. The exhaust gas recirculation system 40 includes an exhaust gas recirculation valve 44 for controlling flow of exhaust gas from the exhaust gas manifold 21 to the intake air system 50.

In another aspect, a butterfly valve 80 includes a body 81 having a bore 82 through which exhaust gas may flow and a valve member 84 within the bore for restricting flow within the bore. The valve member 84 is moveable between a first open position 87 to facilitate maximum flow through the bore 82 and a second closed position 88 at which flow through the bore is blocked. A stop 90 extends into the bore 82 to limit movement of the valve member 84 and prevent the valve member from moving to the second closed position 88. The stop 90 defines a third restricted flow position 89 at which the valve member 84 is positioned between the first open position 87 and the second closed position 88.

During operation, exhaust gas exits the first cylinder bank 12 and enters first exhaust manifold 21. The flow of exhaust gas from the first cylinder group 16 towards first turbocharger 60 and through exhaust gas recirculation system 40 is controlled by the position of exhaust restriction valve 26 and by the position of exhaust gas recirculation control valve 44. At start up and some idle conditions, the exhaust gas recirculation control valve 44 may be completely closed. Also in such operating conditions, the exhaust restriction valve 26 may be completely open such that exhaust gas from the first cylinder bank 12 travels through first exhaust manifold 21 and first extension pipe 27 into first turbocharger 60. Exhaust gas from the second cylinder bank 13 travels through the second exhaust manifold 31 and second extension pipe 37 into second turbocharger 61. Since no exhaust gas is being recirculated through the exhaust gas recirculation system 40, exhaust gas from the first cylinder bank 12 is entirely directed towards the first turbocharger 60. Thus, the pressure within the first and second manifolds 21, 31 will be generally equal and little, if any, exhaust gas will travel through the exhaust gas balance tube 65 from the second manifold 31 to the first manifold 21.

As engine speed and load increase, it may be desirable to increase the amount of exhaust gas being recirculated. In doing so, exhaust gas recirculation control valve 44 is utilized to initially control the flow through the exhaust gas recirculation system 40. Once the exhaust gas recirculation control valve 44 is fully open, further increases in the amount of recirculated exhaust gas can be accomplished by gradually closing the exhaust restriction valve 26.

As may be understood, exhaust restriction valve 26 and exhaust gas recirculation control valve 44 are both used to control the amount of exhaust gas that passes through exhaust gas recirculation system 40. Although the control system of the internal combustion engine 10 is configured so that the exhaust restriction valve 26 should not completely close, a failure or error within the control system or a failure of some aspect of the exhaust restriction valve 26 may result in the plate 84 of the exhaust restriction valve closing beyond a desired angle or completely closing. In the instance in which the plate 84 of the exhaust restriction valve 26 is closed beyond a desired angle but is still open, performance of the internal combustion engine 10 will likely be diminished. However, if the plate 84 of the exhaust restriction valve 26 is completely closed and the exhaust gas recirculation valve 44 is also completely closed, no exhaust gas will pass out of the first exhaust manifold 21, either through first turbocharger 60 or the exhaust gas recirculation system 40. This configuration will result in a blockage of the exhaust gas flow within the first exhaust manifold 21 and the resulting build-up of exhaust gas may result in damage to the internal combustion engine 10. Accordingly, the stop 90 is provided to ensure that the plate 84 of the exhaust restriction valve 26 does not extend past a predetermined angle which may result in decreased performance or damage to the internal combustion engine 10.

As more exhaust gas is recirculated through exhaust gas recirculation system 40, less exhaust gas from the first cylinder group 16 of first cylinder bank 12 may pass through first exhaust manifold 21 into first turbocharger 60. The reduction in exhaust gas flow within the first cylinder bank may result in a pressure differential between the first exhaust manifold 21 and the second exhaust manifold 31. As a result of greater pressure within second exhaust manifold 31 due to the recirculation of some of the exhaust gas from the first cylinder bank, exhaust gas in the second cylinder bank 13 passes from second exhaust manifold 31 through exhaust gas balance tube 65 into first exhaust manifold 21 to balance the flow through the first and second exhaust manifolds. Rotation of the first turbocharger 60 compresses air drawn in through the first air intake 53 and rotation of second turbocharger 61 compresses air drawn in through the second air intake 54. The compressed air is routed through first compressed air line 56 and through aftercooler 58. After exiting aftercooler 58, compressed air is mixed with exhaust gas flowing through the exhaust gas recirculation system 40. The combined compressed air and recirculated exhaust gas passes through the compressed air line 55 into the first intake manifold 51 and the second intake manifold 52.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. An internal combustion engine comprising: a plurality of combustion cylinders;

an intake air system for supplying air to the combustion cylinders;

an exhaust gas system fluidly connected to the combustion cylinders, the exhaust gas system including an exhaust manifold, an exhaust gas outlet, and an exhaust restriction valve for controlling flow of exhaust gas from the exhaust manifold to the exhaust gas outlet, the exhaust restriction valve including:

a body with a bore through which exhaust gas may flow, the bore having a diameter, an elongated shaft extending across the bore;

a valve member within the bore disposed on the elongated shaft for restricting flow through the bore, the valve member having a valve member diameter generally equal to diameter of the bore, the valve member being movable from a first open position at which flow through the bore is substantially unrestricted by the valve member towards a second closed position at which flow through the bore is substantially blocked, and a stop to prevent the valve member from moving to the second closed position, the stop defining a fixed third restricted flow position with the valve member positioned between the first open position and the second closed position, the stop being a pin fixed within and having an end projecting into the bore to block movement of the valve member by engaging the valve member at the third restricted flow position to prevent movement of the valve member to the second closed position, the pin being generally parallel to the elongated shaft and the end being tapered; and an exhaust gas recirculation system for recirculating exhaust gas from the exhaust gas system to the intake air system, the exhaust gas recirculation system including an exhaust gas recirculation control valve for controlling flow of exhaust gas from the exhaust manifold to the intake air system.

2. The internal combustion engine of claim 1, wherein the bore includes a circumference and the pin extends into an upper quarter of the circumference.

3. The internal combustion engine of claim 1, wherein the pin extends into the bore less than 10 percent of the diameter of the bore.

4. The internal combustion engine of claim 1, wherein the body includes a pin receiving bore and the pin is fixed within the pin receiving bore.

5. The internal combustion engine of claim 4, wherein the pin receiving bore extends from an outer surface of the body and opens into the bore of the body.

6. The internal combustion engine of claim 4, wherein the pin receiving bore extends between a flange of the body and the bore of the body.

7. The internal combustion engine of claim 1, wherein the elongated shaft extends along a centerline through the bore and the pin is offset from the center.

8. The internal combustion engine of claim 7, wherein the end of the pin is tapered to generally follow a curve of the bore of the body.

9. The internal combustion engine of claim 7, wherein the body further includes a flange, and the elongated shaft extends through the flange.

10. An internal combustion engine comprising: a plurality of combustion cylinders;

an intake air system for supplying air to the combustion cylinders;

an exhaust gas system fluidly connected to the combustion cylinders, the exhaust gas system including an exhaust manifold, an exhaust gas outlet, and a butterfly valve for controlling flow of exhaust gas from the exhaust manifold to the exhaust gas outlet, the butterfly valve including:

a body having a bore through which exhaust gas may flow and a pin receiving hole that opens into the bore, the bore having a diameter, an elongated shaft extending across the bore;

a plate within the bore disposed on the elongated shaft for restricting flow through the bore, the plate having a plate diameter generally equal to diameter of the bore and being rotatable from a first open position at which flow through the bore is substantially unrestricted by the plate towards a second closed position at which flow through the bore is substantially blocked, and a mechanical limit to prevent the plate from rotating to the second closed position, the mechanical limit defining a fixed third restricted flow position with the plate positioned between the first open position and the second closed position, the mechanical limit being a pin fixed within the pin receiving hole and having an end extending into the bore to block movement of the plate by engaging the plate at the fixed third restricted flow position to prevent movement of the plate to the second closed position, the pin being generally parallel to the elongated shaft and the end being tapered;

a turbocharger fluidly connected to the exhaust gas system; and an exhaust gas recirculation system for recirculating exhaust gas from the exhaust gas system to the intake air system, the exhaust gas recirculation system including, an exhaust gas recirculation control valve for controlling flow of exhaust gas from the exhaust manifold to the intake air system.

11. The internal combustion engine of claim 10, wherein upon positioning the plate at the third restricted flow position, the plate is at an angle of at least ten degrees from the second closed position.

12. The internal combustion engine of claim 10, wherein upon positioning the plate at the third restricted flow position, the plate is at an angle of 25 degrees±15 degrees from the second closed position.

13. The internal combustion engine of claim 10, further including a first valve seat and a second valve seat along the bore.

14. The internal combustion engine of claim 10, wherein the elongated extends along a centerline through the bore and the pin is offset from the center.

15. The internal combustion engine of claim 14, wherein the end of the pin is tapered to follow a curve of the bore of the body.

16. The internal combustion engine of claim 14, wherein the body further includes a flange, and the elongated shaft extends through the flange.

* * * * *